(12) United States Patent
Thompson et al.

(10) Patent No.: US 7,681,300 B2
(45) Date of Patent: Mar. 23, 2010

(54) METHOD OF BROACHING A WORK-PIECE

(75) Inventors: Travis M. Thompson, Ann Arbor, MI (US); Jeffrey R. Lee, Tipton, MI (US); Stephen D. Doubler, Saline, MI (US); Robert P. Guiliani, Brooklyn, MI (US); James W. McGregor, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 71 days.

(21) Appl. No.: 11/936,146

(22) Filed: Nov. 7, 2007

(65) Prior Publication Data

US 2008/0052894 A1 Mar. 6, 2008

Related U.S. Application Data

(62) Division of application No. 11/333,153, filed on Jan. 17, 2006, now Pat. No. 7,402,011.

(60) Provisional application No. 60/692,936, filed on Jun. 22, 2005.

(51) Int. Cl.
*B23P 13/00* (2006.01)
(52) U.S. Cl. .......................................... 29/557; 29/558
(58) Field of Classification Search .................... 29/557, 29/558, 559, 893, 893.3, 893.35
See application file for complete search history.

(56) References Cited

U.S. PATENT DOCUMENTS

| | | | |
|---|---|---|---|
| 1,708,798 A * | 4/1929 | Nelson | 408/137 |
| 1,734,787 A | 11/1929 | Appleton | |
| 3,836,277 A | 9/1974 | Brooks | |
| 3,944,379 A | 3/1976 | Elrod | |
| 4,730,963 A * | 3/1988 | Kuroiwa et al. | 409/278 |
| 4,932,642 A | 6/1990 | Salenbien et al. | |
| 6,663,471 B2 * | 12/2003 | Kamamura et al. | 451/47 |
| 6,883,358 B2 | 4/2005 | Hauf | |
| 2002/0076287 A1 * | 6/2002 | Glaspie | 409/262 |
| 2003/0118418 A1 * | 6/2003 | Kinoshita et al. | 409/270 |
| 2005/0070400 A1 | 3/2005 | Hirata et al. | |

FOREIGN PATENT DOCUMENTS

EP 0606032 A1 7/1994

\* cited by examiner

*Primary Examiner*—Jermie E Cozart
(74) *Attorney, Agent, or Firm*—Quinn Law Group, PLLC.

(57) ABSTRACT

A device for centering a work piece with respect to a centerline of a tool includes a radially-stationary component rigidly secured with respect to the tool such that the radially-stationary component and the tool are concentric. A biasing mechanism is biased away from the radially-stationary component to apply substantially equally-distributed radial force at a periphery of the work piece to thereby center the work piece with respect to the tool. A method of broaching a work piece having an inner and an outer diameter includes machining the outer diameter and then applying circumferentially-distributed radial force to the inner diameter or the outer diameter to thereby center the work piece with respect to a broach tool. After the applying step, the method includes broaching the inner diameter of the work piece using the broach tool.

7 Claims, 5 Drawing Sheets

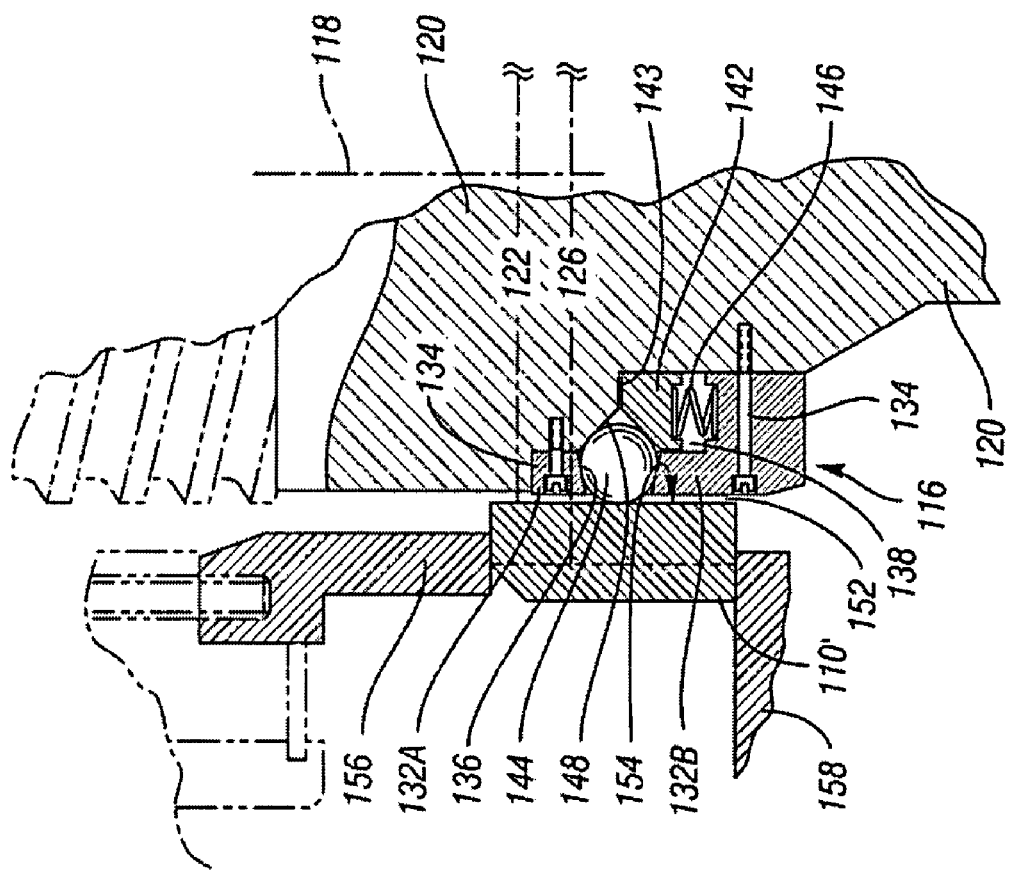
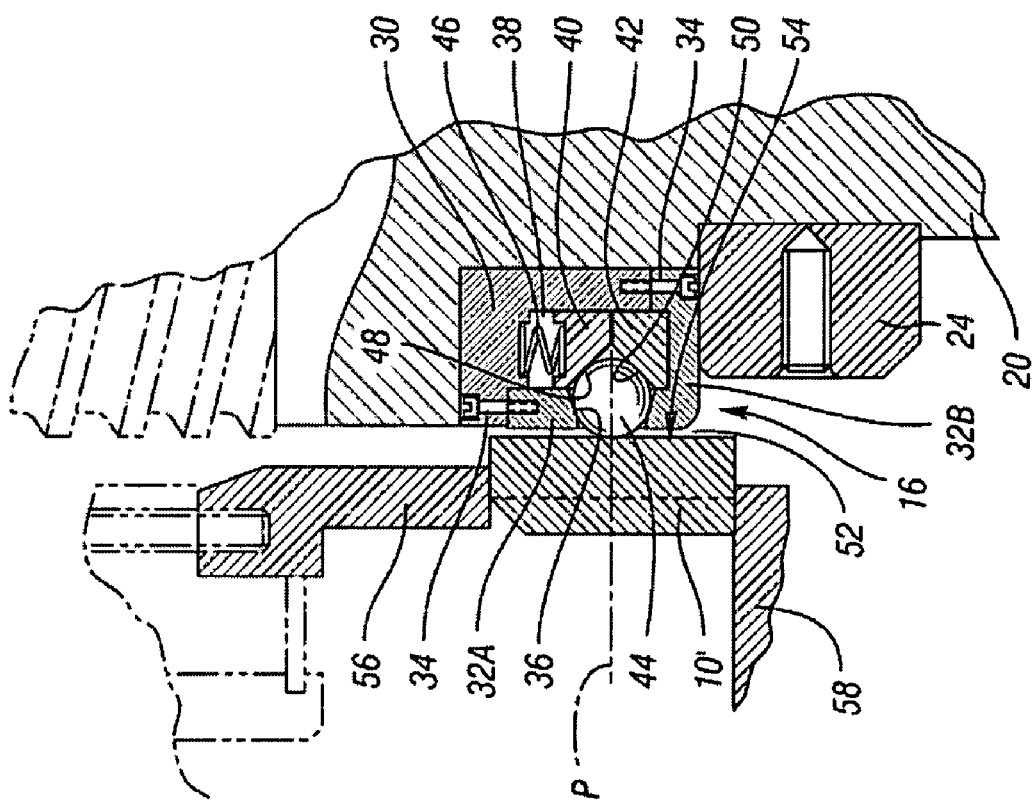
FIG. 3
FIG. 4

US 7,681,300 B2

METHOD OF BROACHING A WORK-PIECE

CROSS-REFERENCE TO RELATED APPLICATIONS

This application is a divisional application of U.S. patent application Ser. No. 11/333,153, filed Jan. 17, 2006 now U.S. Pat. No. 7,402,011, and claims the benefit of U.S. Provisional Application No. 60/692,936, filed Jun. 22, 2005, both of which are hereby incorporated by reference in their entireties.

TECHNICAL FIELD

The invention relates to a centering device for a work piece; specifically, a device that centers a work piece with respect to a tool, such as a broaching tool. The invention also relates to a method of broaching.

BACKGROUND OF THE INVENTION

The quality and performance of manufactured components is directly related to conformance with part specifications. Conformance with specifications, in turn, is affected by the number of manufacturing processes the component is subjected to, and the cumulative effect of dimensional tolerance or "play" of different specifications. Internal gears, for instance, are typically formed, cut or otherwise provided with an initial inner diameter bore and an outer diameter. Then the gears are subjected to an external broaching process at the outer diameter and then an internal broaching process at the inner diameter. Because both of these processes are piloting operations, in which a work tool is directed axially through the component, specification tolerances at the pre-broach inner diameter are tight to ensure a close fit with the tool and minimize cumulative stack-up of dimensional errors. In fact, the diameter of the pilot section of the broach tool is typically only 0.030 mm-0.050 mm under the smallest acceptable work piece inner diameter. The need for tight dimensional tolerance increases component cost. Additionally, after the external broaching process and prior to the internal broaching process, the component is typically turned, i.e., re-cut, at the inner diameter bore to ensure acceptable concentricity of the inner bore and newly-broached outer diameter. Significant capital cost is associated with this additional process step. Working performance of the finished work piece will be enhanced and the number of scrapped components will be reduced if concentricity of the inner diameter, the outer diameter and the work tool can be controlled with a minimal number of process steps.

SUMMARY OF THE INVENTION

A centering device is provided that centers a work piece with respect to a broach tool to enhance concentricity and minimize the affect of positional tolerance stack-up on the finished component. Specifically, the centering device includes a radially-stationary component that is rigidly secured with respect to the tool so that the radially-stationary component and the tool are concentric. The centering device also includes a biasing mechanism (which may be a spring or a hydraulic or pneumatic piston) that applies a substantially equally-distributed radial force at a periphery of the work piece to center the work piece with respect to the tool prior to machining the work piece with the tool. The periphery of the work piece at which the centering device acts may be an inner diameter or an outer diameter. The outer diameter may be, for instance, the diameter of the inner spline of external gear teeth. The centering device may center the work piece actively, utilizing hydraulic or pneumatic pressure, or passively, utilizing a spring or springs.

The centering device permits an improved method of broaching a work piece. An outer diameter of the work piece may first be machined (e.g., pot broached, castellated, hobbed or turned) to create a desired configuration. The work piece is then shuttled to a broach tool and the tool is lowered so that a pilot section of the tool extends through the work piece. The centering device centers the work piece with respect to the tool. The inner diameter of the work piece may then be broached by moving the working portion of the tool axially across an inner peripheral surface of the work piece. No interim step of turning or recutting the internal diameter of the work piece after machining the outer diameter is necessary.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a fragmentary cross-sectional view of the centering device of FIG. 2;

FIG. 4 is fragmentary cross-sectional view of a second embodiment of a centering device for centering the inner diameter of a work piece with respect to a broach tool;

DESCRIPTION OF THE PREFERRED EMBODIMENTS

Figure 1:
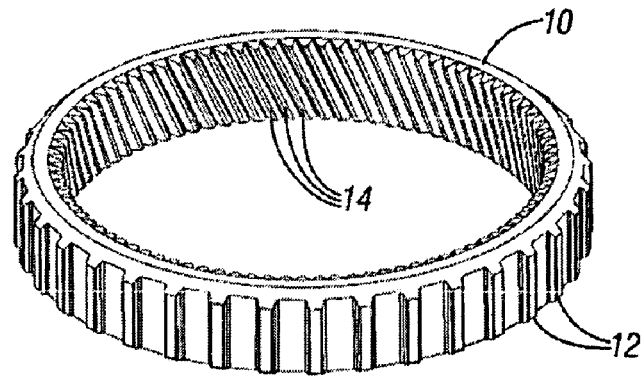
FIG. 1 is a schematic perspective view of an internal gear with external splines.

Referring to the drawings, wherein like reference numbers refer to like components, FIG. 1 shows a finished component 10 which is an internal gear processed to have splines 12 at an outer periphery and teeth 14 at an inner periphery. For quality control, it is important that the internal teeth 14 are concentric with the outer splines 12. Other components having similar concentricity requirements are internal gears with castellated splines on the end or an external gear with an internal spline. The centering devices described below may be applied to work pieces for any component having a machined outer diameter (e.g., an outer diameter subjected to any known machining process such as pot broaching, castellating, hobbing or turning) and requiring a broached inner diameter.

First Embodiment of a Centering Device

Figure 2:
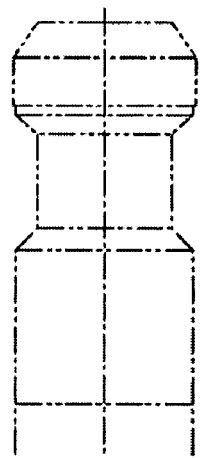
FIG. 2 is a partially cross-sectional elevational view of a centering device for centering the inner diameter of a work piece with respect to a broach tool.

Referring to FIG. 2, an inner diameter centering device 16 ("ID centering device") is shown centering the as yet unfinished component of FIG. 1 as a work piece, which will be referred to herein as 10' in its' unfinished state. The ID centering device 16 ensures that the work piece 10' is centered with respect to a centerline 18 of a broaching tool 20 prior to axial movement of the tool 20 to perform a broaching operation at the inner diameter 22 of the work piece 10'. The inner diameter 22 is achieved by a boring or turning operation occurring prior to the internal diameter broaching operation. Preferably, the outer diameter 26 of the work piece 10', has already been subjected to a machining operation (e.g., pot broached, castellated, hobbed, turned, etc.), to form a machined surface having the external splines 12 of FIG. 1. Alternatively, within the scope of the invention, the outer diameter processing operation may have been to impart other surface characteristics at an outer diameter of a work piece, such as external teeth or axially-extending castellations.

The ID centering device 16 is annular, and circumscribes the pilot section 19 of the tool 20. A retaining device 24 is fastened about the tool 20 and secures the ID centering device 16 to the tool 20 by sandwiching the device 22 in an axial position at a shoulder 27 formed on the tool 20. Thus, the centering device 16 will move axially with the tool 20 as the tool 20 is lowered through the work piece 10' and the work section 29 of the tool 20 processes the surface at the inner diameter 22. The retaining device 24 may be a split clamp, a wedge lock, a nut (as shown) with a ground thread or ground with retaining screws, or any other known means of retention that affords accurate location of the centering device 16 with respect to the tool 20.

Referring now to FIG. 3, the ID centering device 16 includes a base component 30 and a retainer 32A, 32B having a top portion 32A and a bottom portion 32B both of which are secured to the base component 30 with fasteners 34. Each of the base component 30, the top portion 32A and the bottom portion 32B are radially-stationary components, secured with respect to the tool 20 and concentric therewith due to tight tolerances at which they are ground. If other types of retaining devices other than a retaining nut are employed, concentricity may be ensured by, for instance, a reliable locking device rather than tight dimensional tolerances. When secured to the base component 30, the top and bottom portions 32A, 32B are axially-spaced from one another to form a tapered slot 36 therebetween. A cavity 38 is defined by and formed between the base component 30 and the retainer portions 32A, 32B. Top and bottom wedging devices 40 and 42, respectively circumscribe the base component 30 within the cavity 38. The wedging devices 40, 42 are sized such that they are axially slidable within the cavity 38. It should be appreciated that the base component 30, the retainer 32A, 32B, and the wedging devices 40, 42 are all annular such that they circumscribe the tool 20.

Contact elements, which may be centering balls 44 (one shown) are nested between the retainer 32A, 32B and the wedging devices 40, 42 and spaced about the tool 20. A spring 46 (or a plurality of springs) is seated between the base component 30 and the top wedging device 40. An annular wave spring or Belleville spring may be employed, or a plurality of compression springs may be circumferentially spaced about the tool 20 within the cavity 38. The spring 46 biases the top wedging device 40 toward the bottom wedging device 42. The wedging action of the spring 46 imparts a radial force to the ball 44 via beveled surfaces 48, 50 of the wedging devices 40, 42, respectively, which contact the ball 44. The ball 44 is sized with respect to the slot 36 such that a portion of the ball protrudes from the slot 36, spanning a clearance gap 52 (the size of which is a function of the dimensional tolerance of the work piece 10') between the inner diameter 22 (see FIG. 2) and the tool 20. Thus, the ball 44 is biased by the spring 46 and the wedging devices 40, 42 to contact and impart a radially-outward force at the inner diameter 22 of the work piece 10'. Because a plurality of balls 44 circumscribes the tool 20, the radially-outward force is equally distributed about the inner periphery 54 of the work piece 10' and acts in an axial plane P on the work piece 10'. Thus, the base component 30 acts as a reaction member for the radial force imposed by each the ball 44 at the inner periphery of the work piece 10'. The centering balls 44, wedging devices 40, 42 and spring 46 may be referred to as a biasing mechanism.

Because the base component 30 is concentric with the tool 20, the inner diameter 22 of the work piece 10' is made concentric with the tool 20, eliminating tolerance stack-up between the tool 20 and the inner diameter 22. Once the work piece 10' is made concentric with the tool 20, a top clamp 56 is moved downward to secure the work piece 10' between the top clamp 56 and a part locator 58, such as a work table. Accordingly, a subsequent broaching operation at the inner diameter 22 may be carried out without an intervening turning operation to ensure concentricity of the inner diameter 22 to the tool 20. Because the tool 20 is concentric with the work piece 10', the tooth form or feature imparted by the tool 20 will be concentric with the inner diameter 22.

Second Embodiment of a Centering Device

FIG. 4 shows an alternative embodiment of an inner diameter (ID) centering device 116 which in this case is integrated with a broach tool 120. The centering device 116 centers a work piece 110' with respect to a centerline 118 of the tool 120 prior to an internal broaching operation. The work piece 110' has already been subjected to a machining operation, such as pot broaching, to form splines at an outer diameter 126. The ID centering device 116 includes a retainer 132A, 132B having a top portion 132A and a bottom portion 132B both of which are secured to the tool 120 with fasteners 134. Production clearances of the tool and the centering device ensure concentricity of these components with respect to one another. The top portion 132A and the bottom portion 132B are radially-stationary components, secured with respect to the tool 120 and concentric therewith. When secured to the tool 120, the top and bottom portions 132A, 132B are axially-spaced from one another to form a tapered slot 136 therebetween. The tool 120 is formed with a beveled surface 148. A cavity 138 is formed between the tool 120 and the retainer 132A, 132B. A wedging device 142 circumscribes the tool 120 and is sized so that it is axially slidable with respect to the tool 120 in the cavity 138 between the bottom portion 132B and a shoulder 143 of the tool 120 adjacent the beveled surface 148.

Contact elements, also referred to as centering balls 144 (one shown) are nested between the retainer 132A, 132B, the beveled surface 148 and the wedging device 142. A spring 146 (or a plurality of springs) is seated between the retainer bottom portion 132B and the wedging device 142. An annular wave spring or Belleville spring may be employed, or a plurality of compression springs may be circumferentially spaced about the tool 120 within the cavity 138. The spring 146 biases the wedging device 142 toward the beveled surface 148. The wedging action of the wedging device 142 and the beveled surface 148 imparts a radial force to the ball 144. The centering balls 144, wedging device 142 and spring 146 may be referred to as a biasing mechanism. The ball 144 is sized with respect to the slot 136 such that a portion of the ball 144 protrudes from the slot 136, spanning a clearance gap 152 between the inner diameter 122 of the work piece 110' and the tool 120. Thus, each ball 144 imparts a radially-outward force at the inner diameter 122 of the work piece 110'. Because a plurality of balls 144 circumscribes the tool 120, the radially-outward force from the balls 144 is equally distributed about the inner periphery 154 of the work piece 110'. The ball 144 rests against the beveled surface 148 of the tool 120 and thus makes the inner diameter 122 of the work piece 110' concentric with the tool 120. Once the work piece 110' is made concentric with the tool 120, a top clamp 156 is moved downward to secure the work piece 110' between the top clamp 156 and a part locator 158, such as a work table. Accordingly, a subsequent broaching operation at the inner diameter 122 may be carried out without an intervening turning operation to ensure concentricity of the inner diameter 122 to the tool 120. Because the tool 120 is concentric with the work piece 110', the tooth form or feature imparted by the tool 120 will be concentric with the inner diameter 122.

Third Embodiment of a Centering Device

Figure 5:
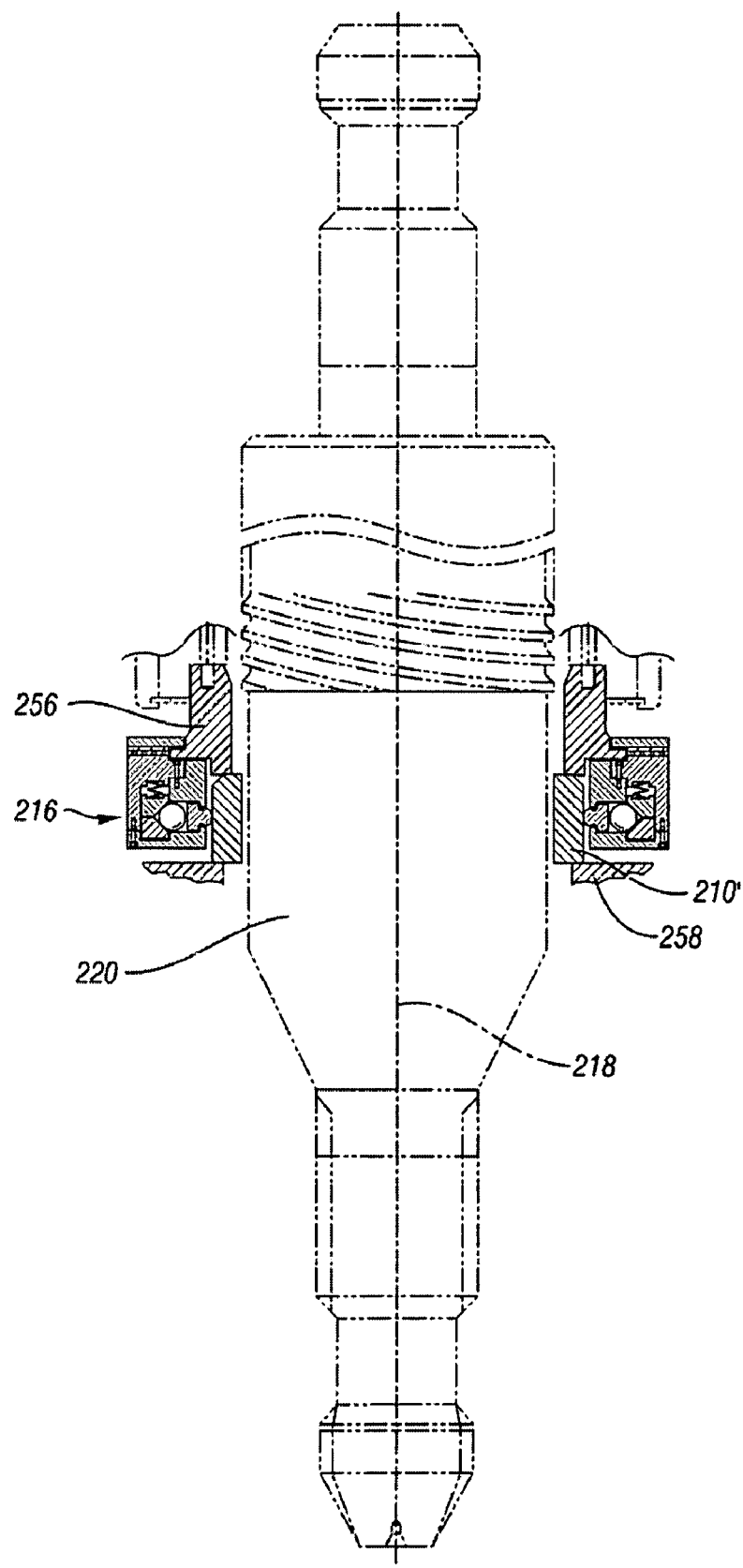
FIG. 5 is partially cross-sectional elevational view of a third embodiment of a centering device for centering the outer diameter of a work piece with respect to a broach tool.

Referring to FIG. 5, a third embodiment of a centering device 216 which, in this case, is an outer diameter ("OD") centering device, is shown circumscribing a work piece 210' and a broach tool 220. The centering device 216 is rigidly secured to a top clamp 256 which is concentric with respect to the broach tool 220. Alternatively, but not shown, the centering device 216 may be secured to a part locator 258 which may be a table or another machine component. Such a design would work equally as well as securing the centering device 216 to the clamp 256, as both the clamp 256 and the part locator 258 are concentric with respect to the tool 220. (Concentricity of the tool 220 with respect to the centering device 216 is ensured by an adjustment feature 235 (shown and described below with respect to FIG. 6)).

Figure 6:
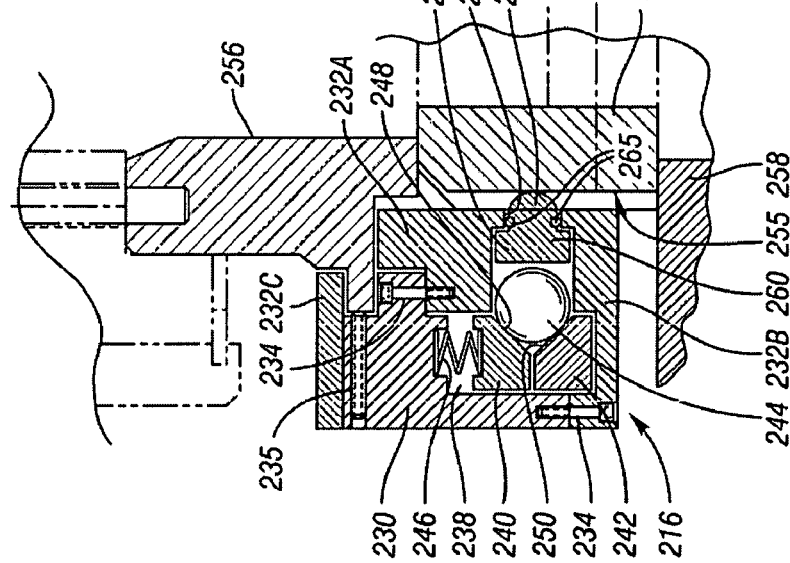
FIG. 6 is a fragmentary cross-sectional view of the centering device of FIG. 5.

Referring to FIG. 6, the centering device 216 acts on an outer periphery 255 of the work piece 210' at the outer diameter 226 (the outer diameter 226 is the inner diameter of the spline formed the outer diameter of the work piece 210') to center the work piece 210' with respect to a centerline 218 (see FIG. 5) of the tool 220.

The OD centering device 216 includes a base component 230 and a retainer 232A, 232B, 232C having a top portion 232A and a bottom portion 232B (both of which are secured to the base component 230 with fasteners 234) as well as a cover plate 232C. Each of the base component 230, the top portion 232A and the bottom portion 232B are radially-stationary components, secured by the adjustment feature 235 with respect to a clamp 256. The adjustment feature 235, commonly referred to as a "stir-around" adjustment feature, allows manual, radial adjustment of the position of the centering device 216 with respect to the clamp 256 to ensure proper centering of the centering device 216 with respect to the centerline 218 of the tool 220. The adjustment feature 235 may be a jack screw. Various methods of alignment, such as by laser, may be employed to ensure concentricity of the centering device 216 with the tool 220, the adjustment feature 235 being employed to achieve the desired alignment. When secured to the base component 230, the top and bottom portions 232A, 232B are axially-spaced from one another to form a slot 236 therebetween. A cavity 238 is formed between the base component 230 and the retainer 232A, 232B. Top and bottom wedging devices 240 and 242, respectively circumscribe the retainer 232A, 232B within the cavity 238. The wedging devices 240, 242 are sized such that they are axially slidable within the cavity 238. The base component 230, the retainer 232A, 232B, and the wedging devices 240, 242 are all annular such that they circumscribe the tool 220 (shown in FIG. 5).

Centering balls 244 (one shown) are nested between the retainer 232A, 232B and the wedging devices 240, 242. A spring 246 (or a plurality of springs) is seated between the base component 230 and the top wedging device 240. An annular wave spring or Belleville spring may be employed, or a plurality of compression springs may be circumferentially-spaced about the tool 220 within the cavity 238. The spring 246 biases the top wedging device 240 toward the bottom wedging device 242. The wedging action caused by the spring 246 imparts a radially-inward force to the ball 244 via beveled surfaces 248, 250 of the wedging devices 240, 242, respectively, which contact the ball 244. A plurality of centering pins 260 (one shown) (also be referred to as contact elements) is placed radially-inward of the balls 244 in the cavity 238. A shoulder portion 262 of the pin 260 is larger than the slot 236 such that the pin 260 is retained by the top and bottom portions 232A, 232B. A head portion 264 of the pin 260 is sized to protrude from the slot 236 when radially-inward force from the ball 244 acts upon the pin 260. Annular seal 265 between the head portion 264 and the top and bottom portions 232A, 232B prevents debris from entering the cavity 238 to ensure the accuracy of the centering device 216. The head portion 264 contacts the outer periphery 255 of the work piece 210' at the outer diameter 226 (which is the inner diameter of the splines at the outer periphery 255). Thus, the pin 260 imparts a radially-inward force at the outer diameter spline 226 of the work piece 210'. Because a plurality of balls 244 and pins 260 circumscribe the work piece 210', the radially-inward force is equally distributed about the outer periphery 255 of the work piece 210'. Thus, the base component 230 acts as a reaction member for the radial force imposed through the balls 244 and pins 260 at the outer periphery 255 of the work piece 210'. The centering balls 224, the pins 260, the wedging devices 240, 242 and the springs 246 may be referred to as biasing mechanism. Because the base component 230 is concentric with the tool 220, the outer periphery 255 of the work piece 210' is made concentric with the tool 220, eliminating tolerance stack-up between the tool 220 and the outer diameter 226. Accordingly, a subsequent broaching operation at the inner diameter 222 of the work piece 210' may be carried out without an intervening turning operation to ensure concentricity of the inner diameter 222 to the outer diameter 226, because the outer periphery 255 of the work piece 210' is centered with respect to the tool centerline 218.

Fourth Embodiment of a Centering Device

Figure 7:
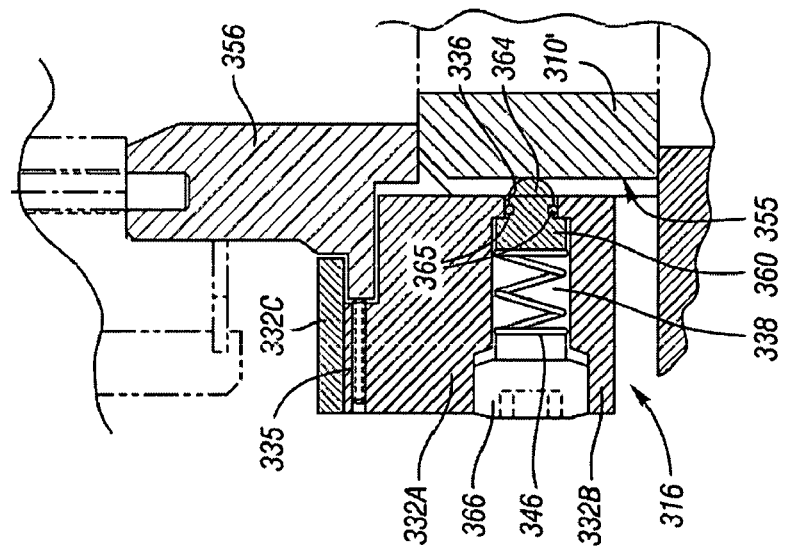
FIG. 7 is a fragmentary cross-sectional view of a fourth embodiment of a centering device for centering the outer diameter of a work piece with respect to a broach tool.

Referring to FIG. 7, an alternative embodiment of an OD centering device 316 is depicted. Like the embodiment of FIG. 6, a retainer 332A, 332B, 332C having a top portion 332A, a bottom portion 332B and a cover plate 332C is secured to a clamp 356. The top portion 332A, bottom portion 332B and cover plate 332C are radially-stationary components. The position of the centering device 316 with respect to the clamp 356 (which is centered with respect to a broach tool (not shown)) may be adjusted with an adjustment feature 335. A plug 366 retains a spring 346 in a cavity 338 to bias the head portion 364 of a centering pin 360 partially through a slot 336 formed between the top and bottom retainer portions 332A and 332B and into contact with the outer periphery 355 of a work piece 310' at an inner diameter of a spline formed thereon. A plurality of springs 346 is spaced circumferentially about the work piece 310', as are centering pins 360. Plug 366 may be a single annular plug or may represent a plurality of circumferentially-spaced plugs. Seals 365 prevent debris from entering the cavity 338 to ensure the accuracy of the centering device 316.

Fifth Embodiment of a Centering Device

Figure 8:
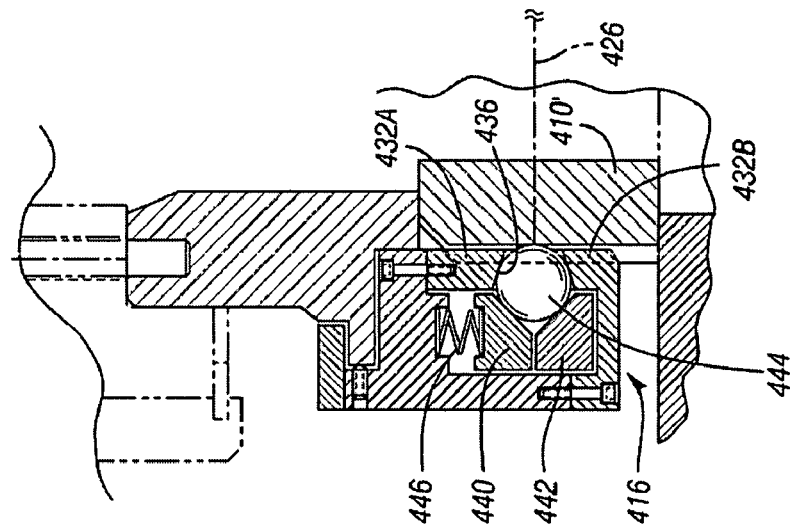
FIG. 8 is a fragmentary cross-sectional view of a fifth embodiment of a centering device for centering the outer diameter of a work piece with respect to a broach tool.

Referring to FIG. 8, another embodiment of an OD centering device 416 is illustrated. The centering device 416 functions the same as centering device 216 of FIG. 6, except that no centering pin is utilized; instead, a slot 436 formed by the top and bottom retainer portions 432A, 432B is tapered to allow a contact element or centering ball 444 to contact the outer diameter 426 of a work piece 410' for centering the work piece 410'. A plurality of balls 444 is located about the work piece 410'. A spring 446 maintains tension on top and bottom wedging devices 440, 442, to retain the ball 444 against the work piece 410'. The spring 446, centering balls 444 and wedging devices 440, 442 may be referred to as a biasing mechanism. The embodiments of FIGS. 2-8 are "passive" centering devices in that the stored potential energy of a spring (i.e., spring 46, 146, 246, 346 or 446) automatically accomplishes the centering function.

Sixth Embodiment of a Centering Device

Figure 9:
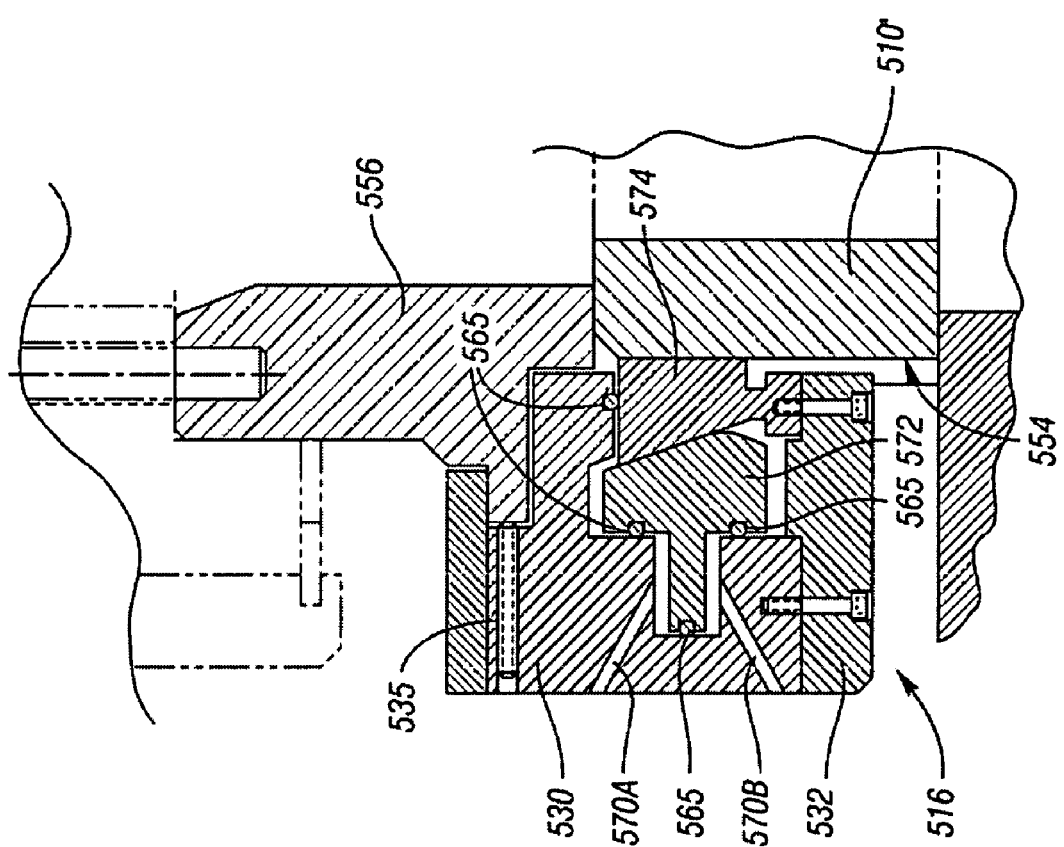
FIG. 9 is a fragmentary cross-sectional view of a sixth embodiment of a centering device for centering the outer diameter of a work piece with respect to a broach tool.

Referring to FIG. 9, another embodiment of an OD centering device 516 is illustrated. A base component 530 and a retainer 532 are secured to a clamp 556 via an adjustment feature 535 which is centered with respect to a broach tool (not shown). The base component 530 and the retainer 532 are both radially-stationary components. The position of the centering device 516 may be adjusted with the adjustment feature 535. Channels 570A, 570B provided in the base component 530 allow externally supplied and controlled hydraulic or pneumatic hydraulic or pneumatic pressure to be applied to a piston 572, which is forced axially downward (if greater pressure is applied in channel 570A) to act as a wedging device to tighten a contact element or a collet 574, or upward (if greater pressure is applied in channel 570B) to loosen the collet 574 which contacts a splined outer periphery 554 of a work piece 510' at an outer diameter of the work piece 510' (which is an inner diameter of the spline thereon). The piston 572 and collet 574 may be referred to as a biasing mechanism. Seals 565 are employed to prevent dirt and debris from contact the working parts of the centering device 516. Unlike the previously described centering devices 16, 116, 216, 316 and 416, the centering device 516 is an "active" centering device. An "active" centering device is one in which the application of radial force is not automatic (as with a spring force) but must be selectively applied. Because hydraulic or pneumatic pressure is used to create the radially-inward force on the piston, much higher forces retain the work piece 510' in a centered position than are available with designs utilizing spring force. In addition the amount of the centering force can be varied or removed during the cutting stroke of the broach tool.

Seventh Embodiment of a Centering Device

Figure 10:
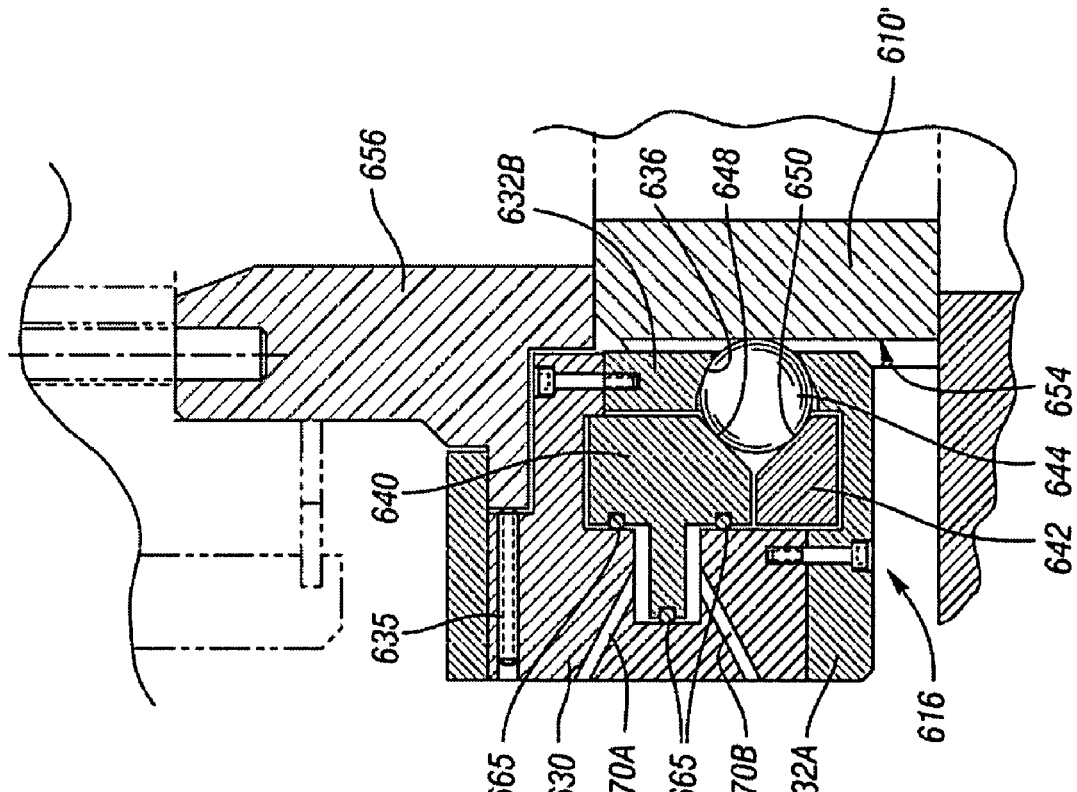
FIG. 10 is a fragmentary cross-sectional view of a seventh embodiment of a centering device for centering the outer diameter of a work piece with respect to a broach tool.

Another embodiment of an active OD centering device 616 is illustrated in FIG. 10. A base component 630 and a retainer 632A, 632B having a top portion 632A, a bottom portion 632B are secured to a clamp 656 which is centered with respect to a broach tool (not shown) via an adjustment feature 635. Channels 670A, 670B in base component 630 allow externally supplied or controlled hydraulic or pneumatic pressure to be applied to a piston or wedging device 640 which is forced axially either downward (if greater pressure is applied in channel 670A) or upward (if greater pressure is applied in channel 670B), applying force to a contact element or centering ball 644 (one shown but a plurality being distributed about the work piece 610') via a beveled surface 648 which acts with beveled surface 650 of wedging device 642 to cause the centering ball 644 to protrude from slot 636 formed between the top and bottom portions 632A, 632B into contact with an outer periphery 654 at the inner diameter of the spline formed on work piece 610'. Seals 665 are employed to prevent dirt and debris from contact the working parts of the centering device 516. The base component 630 and retainer 632A, 632B are radially-stationary. The wedging devices 640, 642 and ball 644 may be referred to as a biasing mechanism.

By employing any of the centering devices described above with respect to FIGS. 1-10, a work piece having a broached outer diameter may be centered with respect to a centerline of a broaching tool. The centering function of the centering device enables the broaching tool to be used to broach the inner diameter of the work piece without turning the inner diameter to be concentric with the outer diameter between machining the outer diameter and broaching the inner diameter.

A method of broaching a work piece having an inner diameter and an outer diameter will now be described with respect to the structure and embodiments described above. However, the method may also be performed with other embodiments of centering devices than those described above. The method includes machining the outer diameter of the work piece. For instance, the work piece 10' of FIGS. 2 and 3 has a splined outer diameter such as is shown with respect to the work piece 10 in FIG. 1. The outer diameter may be machined in a number of ways including pot broaching, castellating, hobbing or turning.

The method also includes applying circumferentially-distributed radial force to the inner diameter 22 or the outer diameter (such as outer diameter 226 of FIG. 6) of the work piece to thereby center the work piece with respect to a broach tool such as tool 20 in FIG. 2 (when the work piece is centered from the inner diameter) or tool 220 of FIG. 5 (when the work piece is centered from the outer diameter). After the radial force is applied, the method includes broaching the inner diameter 22 of the work piece using the broach tool 20 that work piece has been centered with respect to (broach tool 220 in an embodiment using an outer diameter centering device such as in FIGS. 5 and 6). Because the work piece is centered with respect to the tool under the method, the method may avoid a step of turning the inner diameter to be concentric with the outer diameter after the outer diameter is machined but before the inner diameter is broached.

Under the method, a centering device may be used to apply the circumferentially distributed radial force of the work piece. In that instance, the method includes centering the centering device with respect to the broach tool. This may be accomplished, for example, by adjusting the stir-around feature such as stir-around feature 235 shown in FIG. 6, as described above.

If the centering device is a passive centering device, such as in the embodiments described in FIGS. 2-8, the step of applying circumferentially distributed force to the work piece occurs automatically when the centering device is aligned with the work piece. The aligning may occur when the tool (such as tool 220) is lowered so that the centering device circumscribes the work piece (as the centering device 216 circumscribes the work piece 210' in FIG. 6) or such that the work piece circumscribes centering device (as the work piece 10' circumscribes the centering device 16 in FIG. 3). Preferably, the method includes axially clamping the centered work piece prior to the step of broaching the inner diameter. For instance, in the embodiment shown in FIG. 3, the clamp 56 is applied to retain the position of centered work piece 10' prior to broaching the inner diameter of the work piece 10' with the broaching tool 20.

While the best modes for carrying out the invention have been described in detail, those familiar with the art to which this invention relates will recognize various alternative designs and embodiments for practicing the invention within the scope of the appended claims.

The invention claimed is:

1. A method of broaching a work piece having an inner diameter and an outer diameter comprising:
    machining the outer diameter;
    after machining the outer diameter, applying circumferentially-distributed radial force to the inner diameter or the machined outer diameter of the work piece to thereby center the work piece with respect to a broach tool; and
    after the applying step, broaching the inner diameter of the work piece using the broach tool.

2. The method of claim 1, wherein the method is characterized by an absence of turning the inner diameter to be concentric with the outer diameter after the machining step and before the broaching step.

3. The method of claim 1, wherein the applying step occurs automatically as a result of axially aligning a centering device with the work piece.

4. The method of claim 1, further comprising:
    centering a centering device with respect to the broach tool, wherein the radial force is applied by the centering device.

5. The method of claim 4, further comprising:
    prior to said applying step, axially aligning the centering device with the work piece.

6. The method of claim 1, wherein the machining step is one of pot broaching, castellating, hobbing or turning.

7. The method of claim 1, further comprising:
    after the applying step, clamping the centered work piece prior to the broaching step.

* * * * *